United States Patent
Morton et al.

(10) Patent No.: US 7,092,016 B2
(45) Date of Patent: Aug. 15, 2006

(54) METHOD AND SYSTEM FOR MOTION IMAGE DIGITAL PROCESSING

(75) Inventors: Roger A. Morton, Penfield, NY (US); Gabriel Fielding, Webster, NY (US); Christian L. Lurin, Saint Marcel (FR)

(73) Assignee: Eastman Kodak Company, Rochester, NY (US)

( * ) Notice: Subject to any disclaimer, the term of this patent is extended or adjusted under 35 U.S.C. 154(b) by 848 days.

(21) Appl. No.: 10/011,901

(22) Filed: Dec. 4, 2001

(65) Prior Publication Data

US 2002/0109788 A1 Aug. 15, 2002

Related U.S. Application Data

(60) Provisional application No. 60/267,852, filed on Feb. 9, 2001.

(51) Int. Cl.
*H04N 5/217* (2006.01)
(52) U.S. Cl. ..................................... 348/241
(58) Field of Classification Search ................ 348/241, 348/625; 345/419; 358/1.9
See application file for complete search history.

(56) References Cited

U.S. PATENT DOCUMENTS

| | | | | |
|---|---|---|---|---|
| 5,335,013 A | * | 8/1994 | Faber | 348/104 |
| 5,406,326 A | * | 4/1995 | Mowry | 348/121 |
| 5,442,407 A | * | 8/1995 | Iu | 348/620 |
| 5,512,956 A | * | 4/1996 | Yan | 348/606 |
| 5,523,849 A | * | 6/1996 | Jamzadeh | 358/1.9 |
| 5,557,339 A | * | 9/1996 | Dadourian | 348/586 |
| 5,822,453 A | * | 10/1998 | Lee et al. | 382/169 |
| 6,208,348 B1 | * | 3/2001 | Kaye | 345/419 |
| 2001/0022663 A1 | * | 9/2001 | Ishikawa et al. | 358/1.9 |

FOREIGN PATENT DOCUMENTS

EP 0 851 665 A2 1/1998

OTHER PUBLICATIONS

"Noise reduction in image sequences using motion-compensated temporal filtering" by E. Dubois and M.S. Sabri. IEEE Trans. Communications, vol. 32, pp. 826-831, 1984.

(Continued)

*Primary Examiner*—David Ometz
*Assistant Examiner*—James M. Hannett
(74) *Attorney, Agent, or Firm*—Stephen H. Shaw

(57) ABSTRACT

A method for digitally processing motion image signals comprises the steps of: (a) obtaining digital motion image signals that originated from a sequence of motion picture frames; (b) using a frame averaging technique to reduce noise in the digital motion image signals, thereby producing noise-processed motion image signals; and (c) producing output digital motion image signals by sharpening the noise-processed motion image signals with a sharpening filter designed in the spatial domain with a 2D kernel that increases the noise in order to provide a desired grain response.

21 Claims, 8 Drawing Sheets

OTHER PUBLICATIONS

"A New Method for the Evaluation of Visible Resolution on a Display" by Peter G.J. Barten. Proc. of SID, vol. 28/3, 1987, pp. 253-261.

"Motion-compensated multichannel noise reduction of color film sequences" by P.R. Giaccone, G.A. Jones, S. Minelly, A. Curley. *Journal of Electronic Imaging*, SPIE & IS&T, vol. 8, No. 3, Jul. 1999, pp. 246-254.

"Image Processing Fundamentals" by Ian T. Young, Jan J. Gerbrands, Lucas J. van Vliet. CRC Press LLC, Boca Raton, FL.

"Adaptive Noise Reduction and Image Sharpening for Digital Video Compression" by Si Jun Huang. Systems, Man, and Cybernetics, 1997. *Computational Cybernetics and Simulation*, 1997 IEEE International Conference in Orlando, FL on Oct. 12-15, 1997. New York, NY, pp. 3142-3147.

* cited by examiner

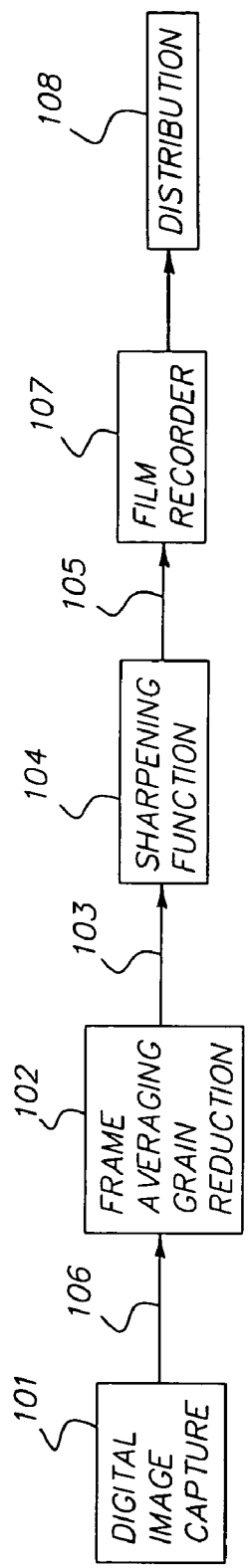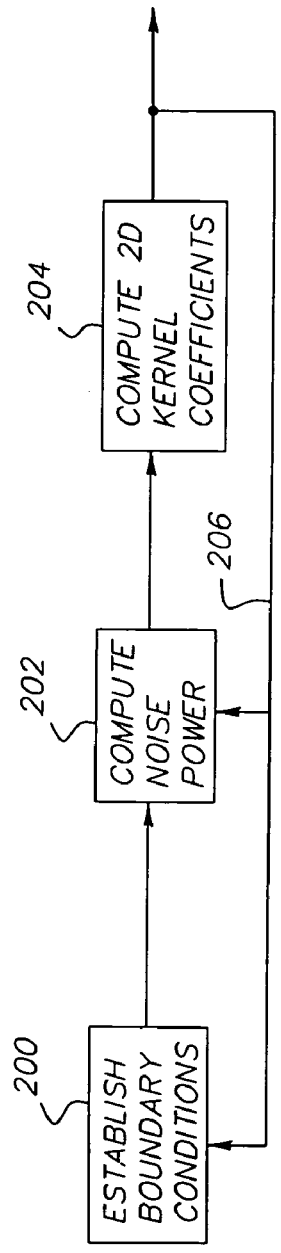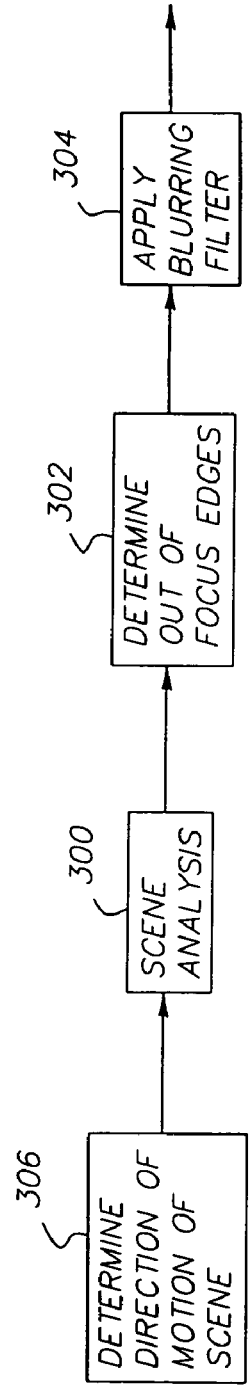

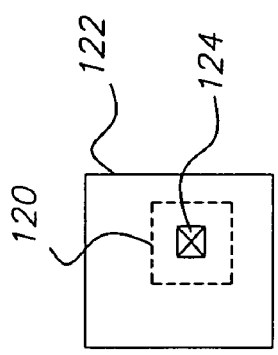
FIG. 2
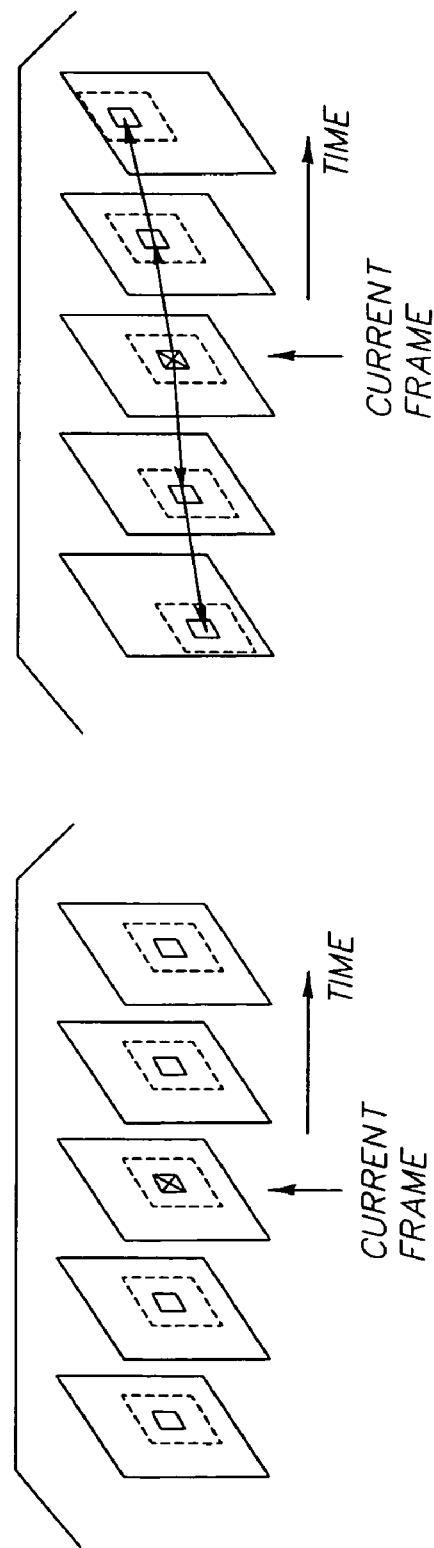
FIG. 3B
FIG. 3A

|  | 1 | 2 | 3 | 4 | 5 | 6 |
|---|---|---|---|---|---|---|
|  | 7.071068 | 6.383961 | 5.868864 | 4.94947 | 4.242841 | 3.535634 |
|  | 0.0000 | 0.0000 | 0.0000 | 0.0003 | −0.3754 | 0.4228 |
| SUM OF 201.002787 | 0.000388 | 0.000264 | −1.27E-06 | 0.00038 | 0.000608 | −0.000467 |
|  | 1 | 2 | 3 | 4 | 5 | 6 |
|  | 0.000388 | 0.000264 | −1.27E-06 | −0.48962 | −0.999392 | −3.999553 |
| ID GOAL▷▷ | 0.0000 | 0.0000 | 0.0000 | −0.5000 | −1.0000 | 4.0000 |
| 1  −0.000398 | 0.000398 | 0 | 0 | 0 | 0 | 1.33E-04 |
| 2  −0.000254 | 0.000254 | 0 | 0.000133 | −0.281731 | 0.187817 | 0.187817 |
| 3  1.27E-06 | −1.27E-06 | 0 | 0.000133 | 0.187817 | −0.281731 | −0.140932 |
| 4  0.49962 | 0.49962 | 0 | 0.000133 | 0.023442 | 0.023442 | −0.140932 |
| 5  0.999382 | −0.999392 | 0 | −0.281731 | 0.255587 | −0.512268 | 0.530319 |
| 6  −3.999633 | 3.999633 | 0 | 0.187817 | −0.512268 | −0.144909 | 0.220926 |
|  |  | 0.000133 | 0.187817 | −0.140932 | 0.530319 | 0.220926 | 2.4030 |
|  |  | 0.000133 | 0.187817 | −0.140932 | −0.512268 | −0.144909 | 0.220926 |
|  |  | 0 | −0.281731 | 0.023442 | 0.255587 | −0.512268 | 0.530319 |
|  |  | 0 | 0.000133 | 0.187817 | 0.023442 | −0.140932 | −0.140932 |
|  |  | 0 | 0 | 0.000133 | 0.187817 | −0.281731 | 0.187817 |
|  |  | 0 | 0 | 0 | 0.000133 | 0.000133 | 0.000133 |
| NOISE POWER OF 20 10.9914 |

FIG. 5A

| LIMIT | 1 | 0.0704 | -0.9308 | 0.3496 | 0.4228 | -0.3754 | 0.0003 | 0.0000 |
|---|---|---|---|---|---|---|---|---|
| | 1 | 1.44E-07 | 3.69E-07 | 2.18E-07 | | | | |
| | | | 0 | | 0.25 | 1 | 16 | |
| | | | 0 | | | | | |

FIG. 5C

METHOD AND SYSTEM FOR MOTION IMAGE DIGITAL PROCESSING

CROSS REFERENCE TO RELATED APPLICATION

Reference is made to and priority claimed from U.S. Provisional Application Ser. No. 60/267,852, filed 9 Feb. 2001, entitled "Motion Image Digital Processing".

FIELD OF THE INVENTION

The invention relates generally to the field of digital image processing, and in particular to techniques for processing motion images.

BACKGROUND OF THE INVENTION

All pictures taken on film exhibit some degree of "graininess" because of the discrete crystals of silver halide in the photographic emulsion. In still image photography, this graininess may be imperceptible in a typical 3"×5" print. In motion picture imaging, the random nature of the grain structure will cause successive frames of the same scene to "sparkle" or "boil". Aggravating the problem is the fact that motion pictures are displayed with high magnifications making graininess more visible for theatre-goers seated closer to the screen.

Small film areas (e.g. 8 mm, 16 mm) require more magnification to fill a movie screen thus magnifying the grains. Moreover, noise accumulates with each intermediate stage of film transfer as the image chain progresses from capture to release print.

Thanks to the advent of digital image processing, it is possible to design filters to reduce noise in a digital image by sampling the same image across multiple frames. Many modern movies involve some form of digital intermediate where the image is digitized using a film scanner. The digital intermediate stage is required for inserting computer graphics into live action shots and for a variety of special effects. The pixels in every frame of a movie can be altered before being printed back to film.

During the 1990's, motion imaging digital effects were tailored to match the quality of traditional 35-mm film processes. Subsequently, digital effects processes expanded into long form digital intermediate. This allows high speed processing of an entire feature film, while preserving the quality and look of the optical film process. Systems analyses indicate that we have the opportunity to distribute to theaters film or digital images that provide a significant increase in overall theatrical image quality by introducing a new generation of digital intermediate. This preferred approach uses current 35-mm film, and involves modest changes in production costs and theater equipment.

Consequently, by exploiting advances in digital technology, using new algorithms and high-speed high-resolution scanning and recording we can give film a clearly superior look. In fact, it will become possible to provide at least 70 mm quality by digitally processing images originated in a 35 mm format. Similarly pre-compensating for artifacts and losses in digital electronic projectors can be achieved in postproduction.

Well-known techniques for filter design can be applied to filtering of motion picture sequences. The difficulty lies in designing a filter that leaves the desired image content intact while removing the undesirable noise. As there is normally some degree of "art" to filtering because the process can change the "look" of the image, what is needed is a technique for adjusting the filters to emulate a desired grain response, such as that of larger film formats.

SUMMARY OF THE INVENTION

It is an objective of this invention to provide a larger format quality, e.g., 70 mm quality, by digitally processing images originated in a smaller format, e.g., a 35 mm format.

It is a further objective of this invention to sharpen the image so as to preserve the noise characteristic or grain characteristic of the incoming image.

It is an alternative objective of this invention to electronically modify the depth of field of the image data, particularly digitally captured image data.

The present invention is directed to overcoming one or more of the problems set forth above. Briefly summarized, according to one aspect of the present invention, a method for digitally processing motion image signals comprises the steps of: (a) obtaining digital motion image signals that originated from a sequence of motion picture frames; (b) using a frame averaging technique to reduce noise in the digital motion image signals, thereby producing noise-processed motion image signals; and (c) producing output digital motion image signals by sharpening the noise-processed motion image signals with a sharpening filter designed in the spatial domain with a 2D kernel that increases the noise in order to provide a desired grain response.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 1 is a block diagram of an overall system, illustrating the signal process flow in accordance with the invention.

FIG. 2 is an illustration of a typical region of support for the frame averaging filter used in the signal process flow shown in FIG. 1.

FIGS. 3A and 3B show two ways of extending the region of support shown in FIG. 2, including a fixed window extension and a motion-compensated extension, respectively.

FIG. 4 is a diagram illustrating the stages involved in the calculation of a noise spectral response corresponding to that of film grain.

FIG. 7 is a block diagram of the process flow for determination of depth of field.

DETAILED DESCRIPTION OF THE INVENTION

Figure 5:
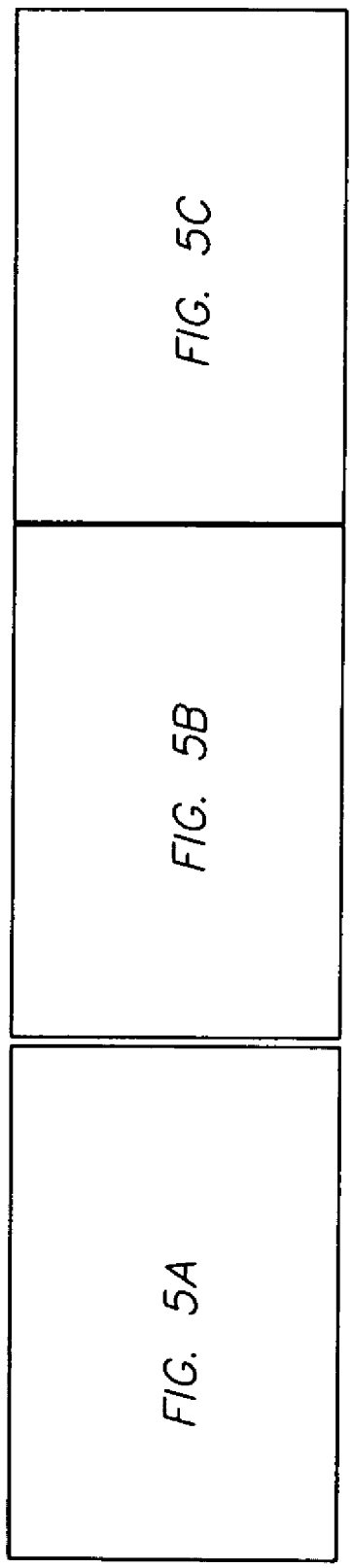
FIG. 5 is shows a spread sheet for an exemplary program to calculate a 1D to 2D conversion while minimizing the noise power under a particular set of boundary conditions.
Figure 5B:
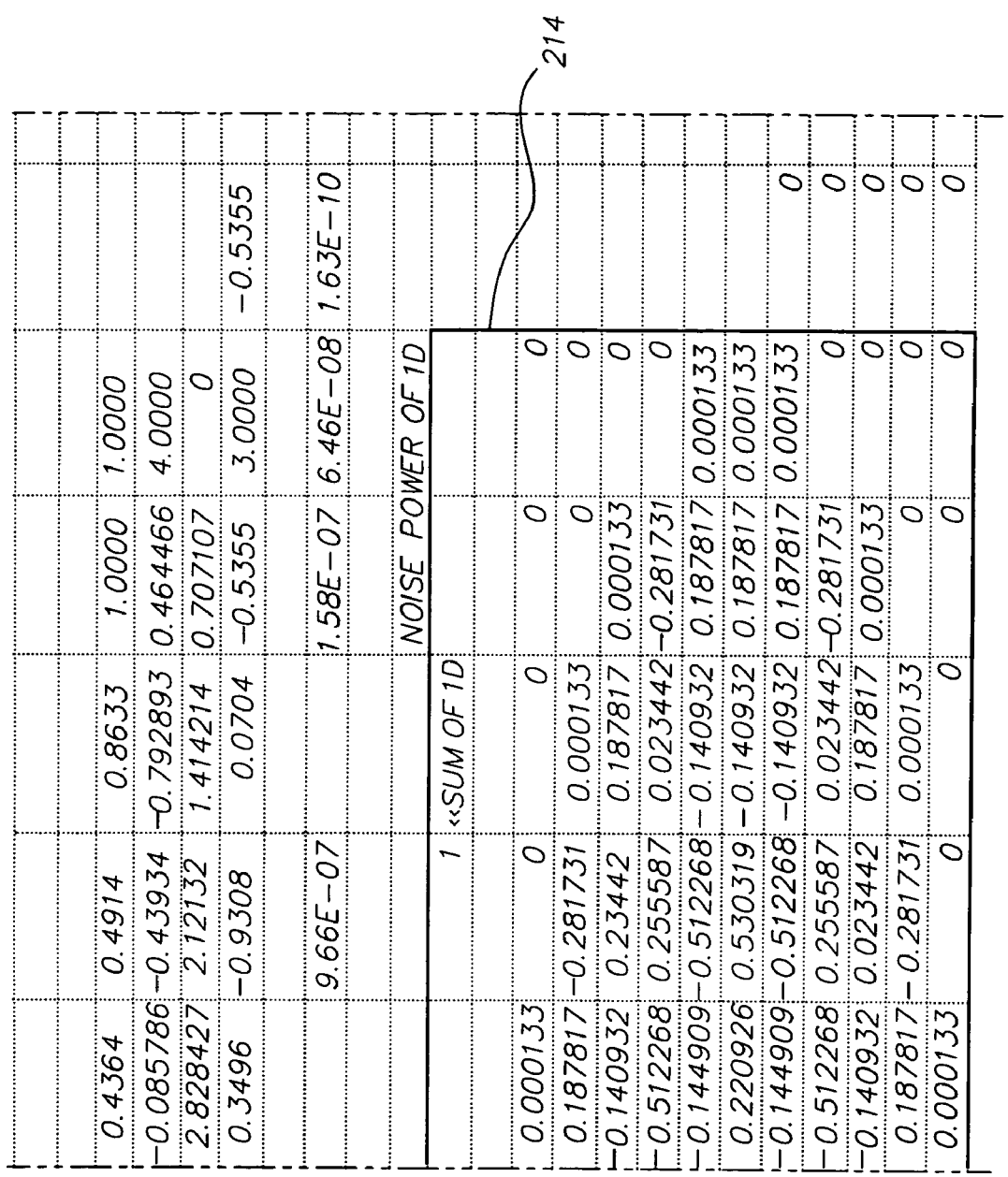

Because digital techniques for motion image processing are well known, the present description will be directed in particular to elements forming part of, or cooperating more directly with, a processing method in accordance with the present invention. Elements not specifically shown or described herein may be selected from those known in the art. Certain aspects of the embodiments to be described may be provided in software. Given the system as shown and described according to the invention in the following materials, software not specifically shown, described or suggested herein that is useful for implementation of the invention is conventional and within the ordinary skill in such arts.

The basic signal process flow, which is shown in the block diagram of FIG. 1, initially comprises the capture of an image using a digital image capture stage 101. This stage may employ either a photographic film, e.g., a negative film, or a digital camera. In a preferred embodiment, a full aperture 35-mm movie camera is used to capture a full aperture negative that is scanned by a 4K scanner, which is included in the stage 101. Shooting full aperture increases film area and therefore more detail is captured on the film. The conversion of a movie camera from standard aperture to full aperture is known to those of skill in these arts. (Specifically, it involves three steps. First, the size of the film gate must be changed. Secondly, the lens is recentered to the center of the full aperture and finally the viewfinder must be able to accommodate the area of the full aperture. This modification may be performed on a variety of conventional cameras.) This is followed by grain reduction in a grain reduction stage 102 using frame-averaging techniques, thereby producing on a line 103 image data that is reduced in grain. In a preferred embodiment, noise is removed in the frame averaging grain reduction stage 102 by using motion compensated noise filtering.

One element in the overall system response is the film grain perceived by the viewer. Grain on the screen arises primarily from grain in camera negative film. In larger film formats grain appears perceptually smaller and therefore less noticeable because there is less magnification of the film onto the screen. Thus, the grain is not magnified to the same extent. To achieve the appearance of 70-mm grain in a 35-mm format requires that the amplitude of the grain be reduced significantly. It is practical to do this electronically using motion compensated noise removal techniques. The notion of using motion compensation with frame averaging has been around for some time (see, e.g., Dubois, E. and Sabri, M. S., "Noise reduction in image sequences using motion-compensated temporal filtering," *IEEE Trans. Communications,* vol. 32, pp. 826–831, 1984, which is incorporated herein by reference).

The principle of motion compensated noise removal is to digitally add, across a number of frames, the intensity of a same point in the scene. By thus determining the digital value of the scene at the same point across multiple frames, a more accurate representation is obtained of the original scene. The challenge is that because various elements of the scene move in different directions, the same point is in a different position in each frame. Accordingly, the movement of every point in the scene is tracked across multiple frames to identify corresponding scene points across a group of frames. Several distinct filtering approaches can be used for motion picture sequences. The different permutations of filters are obtained by answering two questions: "where are the samples collected from" and "how are the samples used to create a filtered pixel value". In answering the first question, image scientists usually refer to the region of support of the filter, which defines the spatial and temporal domain from which samples are collected. The region of support is usually a rectangular window for a single frame or a series of windows for multiple frames.

In FIG. 2, a typical spatial region of support 120 is shown within a single frame 122. The region of support 120 is a graphical representation of the spatial region from which to collect samples for a given pixel. Every pixel within the dotted square is considered in the filtering operation of the current pixel 124 marked in gray. FIGS. 3A and 3B show graphical representations of the spatio-temporal regions of support 120 as extended through a sequence of image frames, and in particular show two ways of extending that region temporally. FIG. 3A shows a fixed-window temporal extension that does not account for image motion between the frames, while FIG. 3B shows a motion-compensated temporal extension that accounts for image motion between frames.

As evident from FIG. 3A, an image sequence can be treated as a stack of still images. Samples may be collected from the local spatial neighborhood in the current frame as well as from adjacent frames both ahead and behind the current frame. Because of the motion of objects in the scene, however, the windows in the adjacent frames may actually contain samples from some other object or the background. Motion compensated filtering attempts to move the windows (as shown in FIG. 3B) in adjacent frames according to the underlying object's motion. If the motion is not known, then a fixed window is often used.

There are different tradeoffs involved with choosing the support of the filter. These tradeoffs include computational requirements and desired filtering characteristics. As the size of the spatial support increases, an image tends to become blurrier. When extending a window into the temporal domain without motion tracking, large motions such as fast-moving objects or camera pans can be blurred. The optimal method for filtering is to track each object and region in a scene and use those tracked samples to form the filtered estimate. Unfortunately, motion-compensation can introduce the possibility that motion artifacts may tend to appear as warping or distortion of the filtered image. Moreover, this technique of motion compensated noise removal has the effect of reducing the grain, possibly to the extent that some grain signal at certain frequencies may need to be restored to achieve a filmic look.

Once the samples are collected, a filtering method such as averaging is used to compute the filtered pixel values. Widely used filtering methods include k-nearest neighbors, sigma-filtering, and adaptive weighted averaging. Again, selection of one filter over another depends upon requirements such as speed and allowable filtering artifacts.

Following the frame averaging grain reduction in stage 102, a sharpening function 104 produces sharpened image data such that the grain noise on a line 105 is similar to the grain noise on line 106. In a preferred embodiment, the sharpening function is a digital sharpening module performing multiple filtering, e.g., with a 11×11 kernel, or aperture correction functions. Additional digital functions may also be performed including lateral inversion and anamorphic scaling. In particular, for embodiments involving digital capture, the depth of field may be digitally modified. The resulting data is written out on film using a high-speed high-resolution recorder 107. The film is then distributed in a distribution function 108 to the screen, TV, storage or transmission means.

Among the various functions expressed in the signal process flow illustrated by FIG. 1, there are three particular features involved in this invention: (1) the provision of filters to match a desired grain response from a power spectrum point of view; (2) the provision of filters in the spatial domain instead of, as is normally done, in the frequency domain; and (3) the electronic modification of the depth of field of the image data. These features will be discussed in order, as follows:

1. The Design of Filters to Match a Desired Grain Response from a Power Spectrum Point of View.

The goal of matching the grain noise or sharpening the image by averaging is achieved in the frame averaging grain reduction stage 102 over, for example, N frames. Because the grain is independent in each frame, it is reduced by the square root of N. The sharpening (filter) function 104 is designed such that it increases the grain noise by a desired, e.g., similar, amount. This is done by specifying the 1D impulse response of the filter. That is the impulse response along a scan line of the image line horizontally and the impulse response vertically across the image. Alternatively, and in addition, diagonal and other directional impulse responses may also be defined either explicitly or as tolerance bands, or some other bounding means.

2. The Design of Filters in the Spatial Domain Instead of, as is Normally Done, in the Frequency Domain, and the Performance of Optimization in the Spatial Domain.

Having defined these 1D impulse responses in various directions from signal, image quality, system and/or other performance considerations, a 2 D kernel is then generated where the boundary conditions correspond to the desired 1 D impulse response (boundary conditions can either be horizontal impulse response or can include vertical, and diagonal or other directions). As shown in FIG. 4, once these boundary conditions are established in a boundary condition establishment stage 200, the noise power of the filter at a spectral frequency corresponding to the spectral frequency of the grain can be computed in a noise power computation stage 202. Then, using Newton, Newton Raphson optimization methods or conjugate optimization methods, a solver program such as is found in Excel from Microsoft, or Matlab from MathCAD, can be used to find the 2 D kernel coefficients in a coefficient generation stage 204 which satisfy the boundary conditions and also produce a noise spectral response corresponding to that of grain. As shown by a line 206 in FIG. 4, this is an iterative computation that provides an opportunity to adjust boundary conditions and noise characteristics.

Figure 6A:
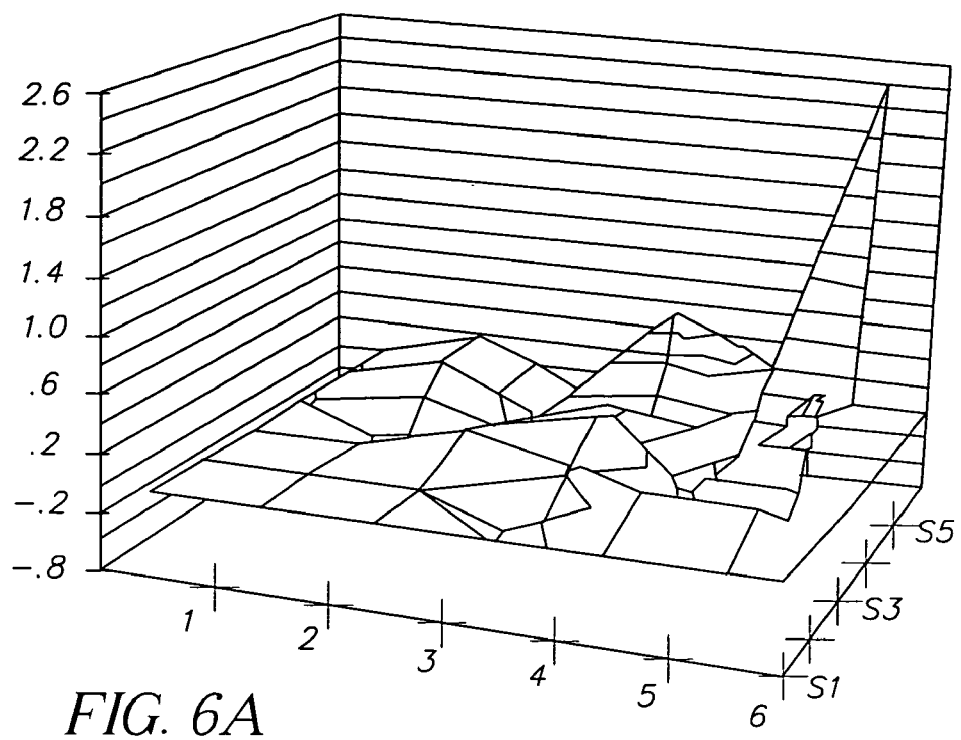
FIGS. 6A, 6B and 6C show three-dimensional views of the kernels calculated according to FIG. 5.
Figure 6B:
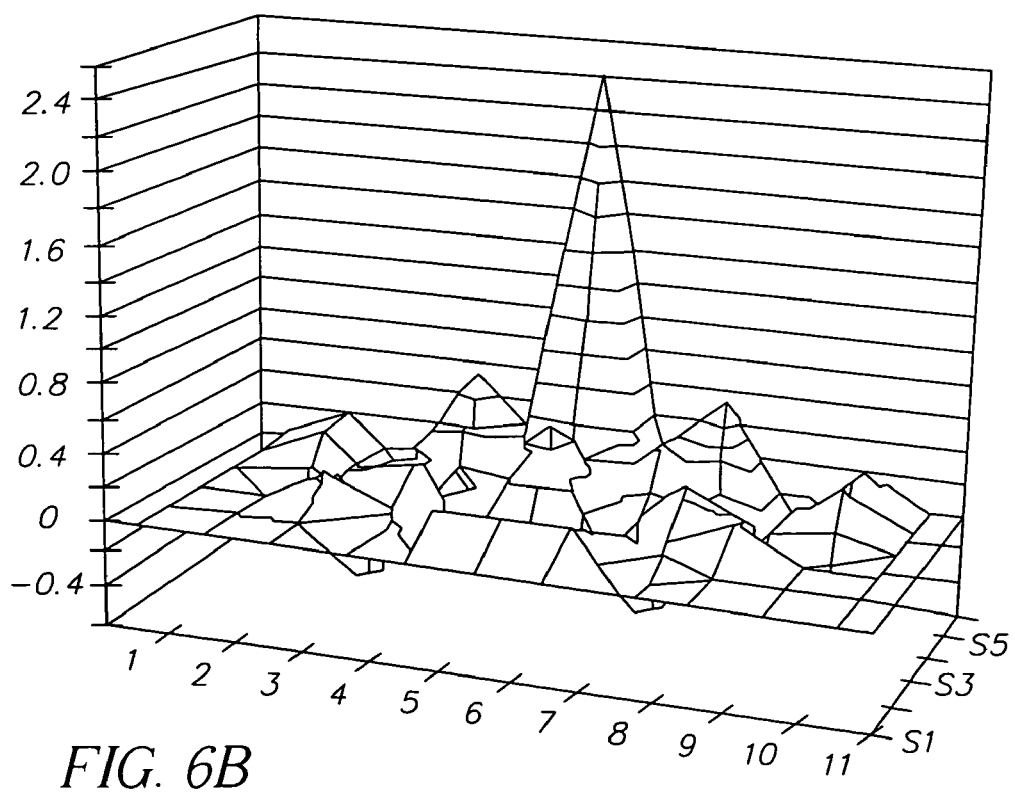
Figure 6C:
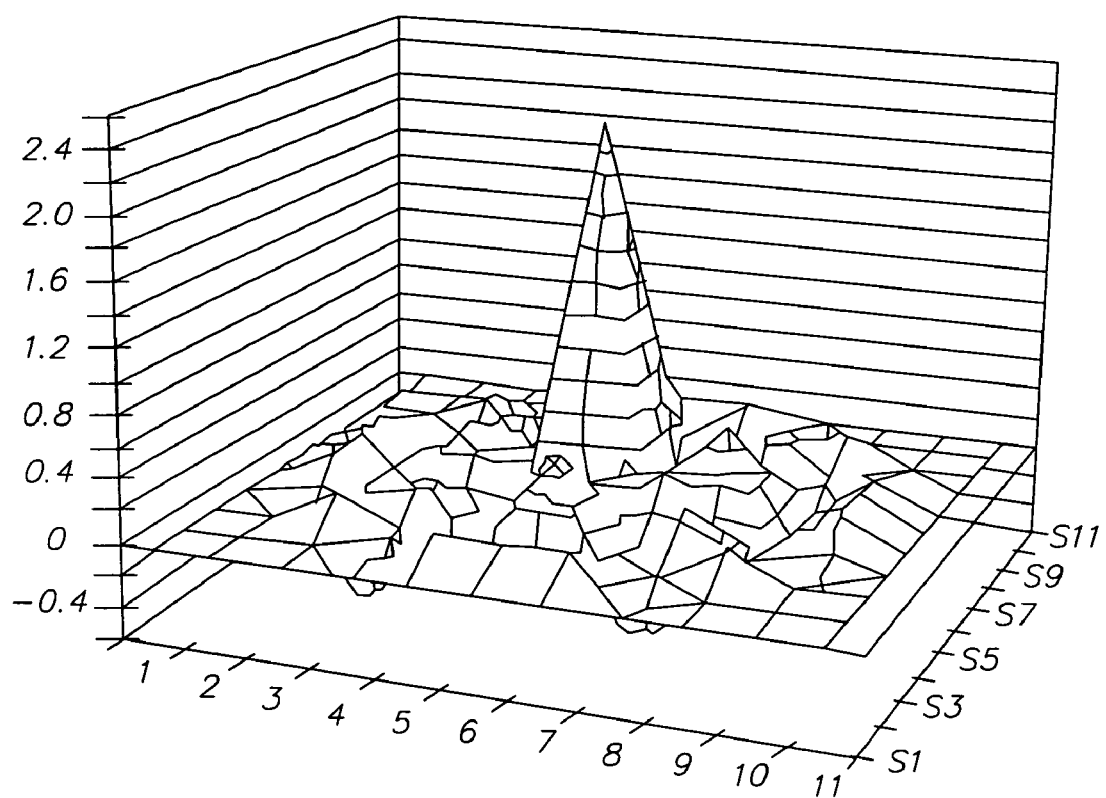

FIG. 5 shows a spread sheet for the input and output variables for an exemplary solver program that calculates the foregoing 1D to 2D conversion while minimizing the noise power under a particular set of boundary conditions. More specifically, the 1D impulse response is numerically set forth on line 210, the noise power of the kernel is numerically set forth on line 212, and the resulting 11×11 kernel coefficients are shown within the box 214. The 3D renderings in FIGS. 6A, 6B and 6C show details of the kernel, including the aggressive action of the central coefficient(s). This technique has resulted in filters with central coefficients in the 2 or 3 to 6 range.

A further approach is to minimize the noise spectral response rather than to match the grain response. There is of course the possibility of trading off the number of frames that are averaged and the noise spectral response of the filter. It may also be desired to produce an image which is both sharp and has less grain, and these elements can be traded off by setting the noise specification and then using optimization methods to determine the sharpest possible filter at a given grain condition. Defining optimal sharpness can be performed by modeling the entire system in which the filter and grain reduction will be inserted and then modeling the eye response using for example the SQIR method of Barten (see Barten, Peter G. J., "A New Method for the Evaluation of Visible Resolution on a Display", *Proc. Of SID*, Vol. 28/3, 1987, pp. 253–261, which is incorporated herein by reference) or some other sharpness and/or noise method (based on perceptual and/or other criteria). It is also possible using this technique to compensate for different horizontal and vertical responses within the system, and also to compensate for anisotropy or isotropy of the grain that may occur because at some point in the system, the system, sub-system or component frequency response or impulse response was not circular.

Determining the desired response of the filter can be achieved by running an image through the system and determining the system's response to that image. The image may be a test target or a specific scene. Well known system identification methods may also be used such that the response of any image running through the system can be analyzed to produce the desired system response data.

This response can then be compared to a desired response and again, using optimization methods, a 1 D filter can be designed that produces the desired result. This is done by, for example, determining the square root of the sum of the squares error between the actual system model with the filter in and the desired system response. Then optimization methods may be used in the spatial domain to minimize this error by computing the 1 D filter response.

Alternatively, the 2D filter response may also be determined in the same way. In this case there is the opportunity to include the grain noise in the test signal and determine a desired response to the noise as well as a desired signal response and optimize the filters within the spatial domain to satisfy both the noise and signal constraints.

3. The Electronic Modification of the Depth of Field of Image Data.

Depth of field is a way in which cinematographers realistically control the attention of a viewer. Areas of greatest importance or deserving more of the viewer's attention are shown with a high sharpness. Images are captured using a camera lens in such a way that the parts of the scene which are not of interest are out of focus. Because electronic cameras have difficulty in achieving a short or small depth of field it is advantageous to be able to control the depth of field electronically.

Referring to FIG. 7, one way to do this is to analyze the scene in a scene analysis stage 300, determine scene edges that are slightly out of focus in an edge focus stage 302 and apply an adjustable blurring filter in a filtering stage 304 to those edges so that they appear further out of focus than when they were captured. Determining an edge that is slightly out of focus can be done by determining the rise distance of the edge or by performing a Fourier analysis or frequency analysis of the edge to identify either the frequency amplitude response, phase response of different harmonics, or both. Sometimes it may be necessary to know the out of focus characteristics of the lens that is being used so that the image processing may sense the degree of out of focus of the image.

While the approach described works well for stationary images, an additional step is required for moving images. This step involves compensating in a directional determination stage 306 for the smear of edges that are moving due to the length of time of exposure of the camera.

Fortunately, the grain reduction algorithms already discussed in connection with the grain reduction frame averaging stage 102 can produce as a by-product of their internal processes, motion vectors for all edges in the image. Thus it is possible to apply corrections to the edge due to motion and produce an edge whose sharpness loss due to motion has been removed. Another approach is to determine the direction of motion and select edges on the moving object that are parallel to the direction of motion.

The invention has been described with reference to a preferred embodiment. However, it will be appreciated that variations and modifications can be effected by a person of ordinary skill in the art without departing from the scope of the invention. For instance, while one objective of this invention is to provide a larger format quality, e.g., 70 mm quality, by digitally processing images originated in a 35 mm format, the invention is also useful in improving smaller formats, e.g., 8 mm or 16 mm, such that their quality will approach that of 16 mm or 35 mm, respectively.

PARTS LIST 101 digital image capture stage
102 grain reduction frame averaging stage
103 line
104 sharpening function
105 line
106 line
107 film recorder
108 distribution function
120 region of support
122 single frame
124 current pixel
200 boundary establishment stage
202 noise power computation stage
204 coefficient generation stage
206 line
210 1D impulse response
212 noise power of the kernel
214 11×11 kernel coefficients
300 scene analysis stage
302 edge focus stage
304 filtering stage
306 directional determination stage

What is claimed is:

1. A method for digitally processing motion image signals comprising the steps of:
    (a) obtaining digital motion image signals that originated from a sequence of motion picture frames;
    (b) using a frame averaging technique to reduce noise in the digital motion image signals, thereby producing noise-processed motion image signals; and
    (c) producing output digital motion image signals by sharpening the noise-processed motion image signals with a sharpening filter designed in the spatial domain with a 2D kernel that increases the noise in order to provide a desired grain response.

2. The method as claimed in claim 1 wherein step (a) is performed with a digital camera.

3. The method as claimed in claim 1 wherein step (a) is performed with a motion picture film camera, and wherein the sequence of motion picture frames is captured on a motion picture film of a predetermined format and the desired grain response obtained in step (c) is at least equivalent to the grain response corresponding to the predetermined format.

4. The method as claimed in claim 1 wherein step (b) comprises using a motion compensated frame averaging noise removal technique to effect noise reduction.

5. The method as claimed in claim 1 wherein the design of the sharpening filter in step (c) comprises;
    establishing boundary conditions corresponding to the impulse response of the filter;
    computing the noise power of the filter at a spectral frequency corresponding to the spectral frequency of the desired grain response; and
    generating a set of kernel coefficients for the 2D kernel.

6. The method as claimed in claim 1 wherein step (c) further comprises electronically modifying the depth of field of the processed digital motion image signals.

7. The method as claimed in claim 6 wherein electronically modifying the depth of field further comprises the steps of:
    analyzing a scene represented in the sequence of motion picture frames;
    determining scene edges that are slightly out of focus; and
    blurring the slightly out of focus scene edges so that they appear further out of focus than when they were captured.

8. A method for digitally processing motion image signals obtained from a motion picture film, said method comprising the steps of:
    (a) obtaining digital motion image signals that originated from a sequence of motion picture frames of a predetermined film format;
    (b) using a frame averaging technique to reduce noise in the digital motion image signals, thereby producing noise-processed motion image signals; and
    (c) producing output digital motion image signals by sharpening the noise-processed motion image signals with a sharpening filter designed in the spatial domain with a 2D kernel that increases the noise in order to provide a desired grain response that corresponds to the grain characteristic of a film format at least as large as the predetermined format.

9. The method as claimed in claim 8 wherein step (a) comprises capturing images on motion picture film with a motion picture film camera and scanning the captured images with a film scanner to obtain the digital motion image signals.

10. The method as claimed in claim 9 wherein the film scanner is at least a 4K high resolution scanner.

11. The method as claimed in claim 9 wherein the motion picture film camera is used at full aperture.

12. The method as claimed in claim 8 wherein step (b) comprises the step of using a motion compensated frame averaging noise removal technique to effect noise reduction.

13. The method as claimed in claim 8 wherein step (c) comprises the step of using a digital sharpening module performing multiple 11×11 filtering or aperture correction of the noise-processed motion image signals.

14. The method as claimed in claim 8 further comprising the step of writing the output digital motion image signals onto motion picture film.

15. The method as claimed in claim 8 wherein step (c) further comprises the step of electronically modifying the depth of field of the processed digital motion image signals.

16. The method as claimed in claim 8 wherein the predetermined format motion picture film is 35 mm motion picture film and the grain response provided in step (c) corresponds to the grain characteristic of 70 mm motion picture film.

17. A system for digitally processing motion image signals, said system comprising:
    (a) a source module for obtaining digital motion image signals that originated from a sequence of motion picture frames;

(b) a noise reduction processor using a frame averaging technique to reduce noise in the digital motion image signals, thereby producing noise-processed motion image signals; and (c) a sharpening stage producing output digital motion image signals by sharpening the noise-processed motion image signals with a sharpening filter designed in the spatial domain with a 2D kernel that increases the noise in order to provide a desired grain response.

18. The system as claimed in claim 17 wherein the source module includes a digital camera.

19. The system as claimed in claim 17 wherein the source module includes a motion picture film camera, and wherein the sequence of motion picture frames is captured on a motion picture film of a predetermined format and the desired grain response obtained in the sharpening stage is at least equivalent to the grain response corresponding to the predetermined format.

20. The system as claimed in claim 17 wherein the noise reduction processor uses a motion compensated frame averaging noise removal technique to effect noise reduction.

21. The system as claimed in claim 17 wherein the sharpening stage further includes a depth of field processor for electronically modifying the depth of field of the processed digital motion image signals.

* * * * *